Aug. 19, 1969  A. F. BEHRING  3,461,557
DEPTH-OF-CUT CONTROL MEANS FOR MEAT TRIMMERS AND THE LIKE
Filed March 6, 1967
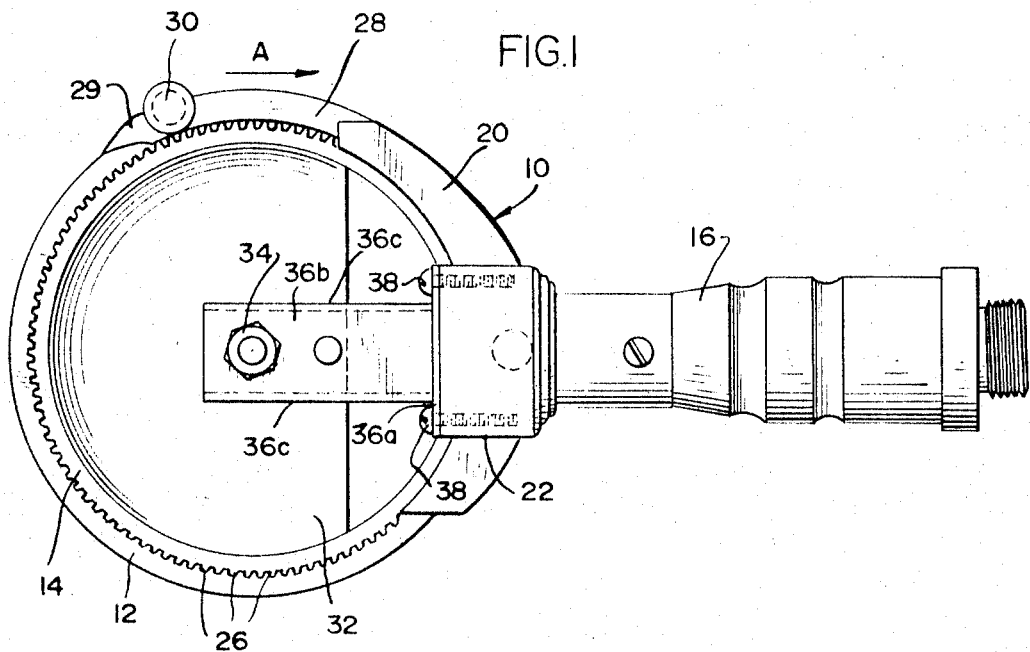
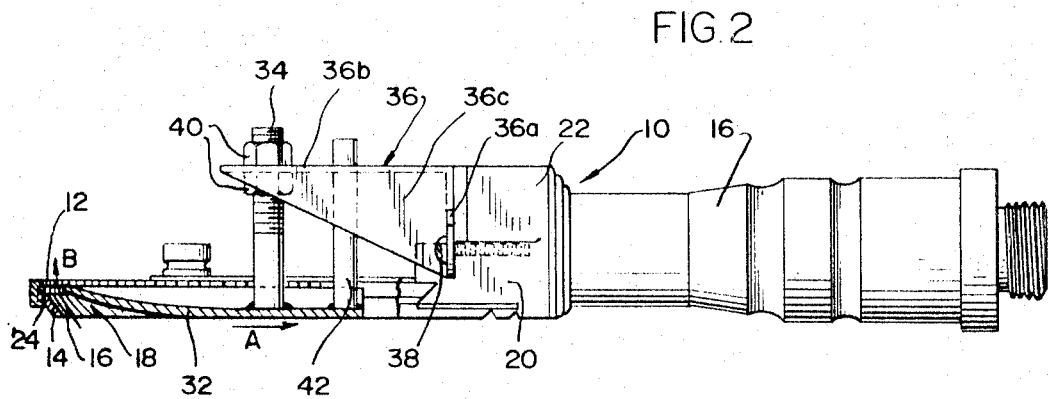
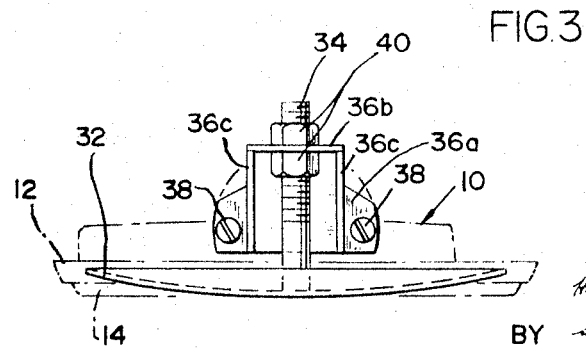
INVENTOR
ARTHUR F. BEHRING
BY Hofgren, Wegner, Allen,
Stellman & McCord.
ATTORNEYS United States Patent Office 3,461,557
Patented Aug. 19, 1969

3,461,557
DEPTH-OF-CUT CONTROL MEANS FOR MEAT TRIMMERS AND THE LIKE
Arthur F. Behring, Sioux Falls, S. Dak., assignor, by mesne assignments, to John Morrell & Co., Chicago, Ill., a corporation of Delaware
Filed Mar. 6, 1967, Ser. No. 621,406
Int. Cl. B26b 3/03
U.S. Cl. 30—276                                    3 Claims

ABSTRACT OF THE DISCLOSURE

This invention relates to cutting devices, and more particularly to a meat trimmer for skinning or dehairing animal carcasses and defatting pieces of meat. The device is adapted to be manually held and manipulated for cutting a strip-like section or slice from a work body by drawing the tool thereacross and includes an annular support lying substantially in a flat plane and supporting an annular cutting blade mounted for rotation in the direction of its own circumference. A handle is rigidly fixed to the support and extends radially outwardly therefrom. The support and blade extend in a continuous relation around, and lying outside of, a common axial opening through which the severed section passes during the cutting thereof from the work body as the blade rotates and the support means is manually drawn across the work body substantially in said plane to sever the section therefrom. The cutting blade is provided with a peripheral circular cutting edge adjacent one end of the common axial opening. A depth control plate is provided and adjustably mounted by means of a bracket secured to the annular support at one point of the circumference thereof, the bracket extending radially outwardly over the common axial opening. The depth control plate is convex in shape whereby its marginal portions are curved outwardly away from the cutting edge of the cutting blade. The depth control plate has a marginal circular portion concentric to the common axial opening and of a slightly smaller diameter than the cutting blade whereby the severed section from the work body passes between the blade and the depth control plate. An adjusting bolt extends from the depth control plate through the mounting bracket for adjusting the plate toward and away from the bracket generally in the direction of the axis of the common axial opening of the support and cutting blade to vary the distance between the plate and blade to vary the thickness of the section severed from the work body. A stabilizer pin is secured to the control plate and slidably received in an opening in the mounting bracket to prevent rotation of the plate when the same is being adjusted.

BACKGROUND OF THE INVENTION

As disclosed in the patent to Bettcher, 3,024,532, one type of meat trimmer comprises an annular support means having an annular blade of substantially frusto-conical shape projecting therefrom and provided with a cutting edge on the small diameter end thereof. The device operates effectively to cut a section or slice from a work body during relative translatory movement between the blade and work holder supporting the work body. During the cutting operation, the severed section or slice passes through a common central axial opening of the support means and blade. The cutting device is manually operable and includes a driving means operating through a gear means mounted within a handle rigidly fixed to the support means for rotating the annular blade. It has been found that in using cutting devices of the character described, it is difficult to control the depth of the cut in defatting or trimming operations and many times an inexperienced operator trims the work body to irregular depths and not only adversely affects the appearance of the trimmed surface of the meat product but removes excessive lean meat from the work body. This invention is directed to a depth control means for such meat trimmers.

SUMMARY OF THE INVENTION

The principal object of this invention is to provide a new and improved cutting device such as a meat trimmer or the like.

Another object of this invention is to provide means for positively controlling the depth of cut in defatting and trimming operations utilizing an annular blade trimmer.

A further object of this invention is to provide a device of the character described which includes means by which the operator can effectively control the thickness of the section or slice to be severed from the work body to provide a tool which an inexperienced operator can easily use.

Still another object of this invention is to provide a meat trimming device of the character described including means to smooth the product being trimmed to not only improve the accuracy of the cutting operation, but to also improve the appearance of the trimmed surface of the work body.

Other objects and advantages of this invention will be apparent from the following detailed description and the accompanying drawings.

DESCRIPTION OF THE DRAWINGS

FIGURE 1 is a top plan view of a meat trimmer embodying the invention;

FIGURE 2 is a side elevation thereof with a portion of the annular support means, blade, and depth control plate cut away to facilitate the illustration; and FIGURE 3 is a front elevation view of the meat trimmer in phantom, with the depth control plate of this invention shown in full lines.

DETAILED DESCRIPTION OF THE INVENTION

Turning to the drawings, a meat trimming device generally designated 10 is shown to comprise an annular support ring 12 and a frusto-conical or ring shaped blade 14 mounted thereon and having a circular cutting edge 16 (FIGURE 2) on the inside or smaller diameter thereof for application to a work body for cutting a section or slice therefrom by drawing the trimmer across the work body. The trimmer can be used for carrying out such a cutting operation on various kinds of work bodies, but it is especially suitable for removing the skin or hair from an animal carcass or for cutting a section or slice of fatty or lean tissue from a slab or body of meat or a meat product, as will be more fully set forth below.

The support ring 12 for the blade is mounted in a coaxial relation to the blade. The support means includes a handle 16 by which the device can be manually held and manipulated in the manner of a hand tool. The handle 16 extends substantially radially outward from the support ring 12 at one point of the circumference of the latter and lies substantially in or adjacent the flat plane of the support ring. The blade 14 and the support ring 12 have a common central opening generally designated 18 for the passage of the severed section or slice axially therethrough and themselves lie in a surrounding relation thereto and wholly outside of such common opening. During the trimming operation, the device is drawn along the work body in the general direction of arrows A (FIGS.

1 and 2) by force manually applied to the handle 16 such that the blade 14 is translated along the top of the work body substantially in the flat plane of the support ring 12. During this cutting operation a strip-like section is trimmed from the work body and passes through the common opening 18 of the device.

The handle 16 comprises a hollow stem of a suitable size and shape to be conveniently grasped by the human hand and has a longitudinal passage (not shown) extending therethrough. The inner end of the handle 16 has a sector portion 20 rigid therewith which contains a gear chamber 22 with which the longitudinal passage through the handle communicates. The handle 16 is disposed so that its axis is perpendicular to and intersect the axis of the common opening 18.

The support ring 12 is secured along a portion of the circumference thereof to the sector portion 20 of the handle and is here shown as being a one-piece metal member lying substantially in a flat plane and having a transverse shape and size so that it will be sufficiently strong to support the blade 14 but will be of minimum transverse dimension and axial thickness for minimizing its size and weight as well as minimizing obstruction to the passage of the severed material through the common opening 18. The support ring 12 has an annular groove 24 (FIG. 2) extending in a continuous relation around the common opening 18.

The blade 14 comprises a one-piece circular or ring shaped metal member of a frusto-conical shape having its cutting edge 16 on the inside or smaller diameter thereof and has gear teeth 26 circumferentially about its upper edge. The gear teeth lie on the side of the blade facing the support ring 12 so that gear teeth are housed, or partially housed, in the groove 24 of the ring support.

The blade 14 is rotatably driven by engagement of a driving gear or pinion (not shown) housed in the gear chamber 22 of the handle section 20 and is connected with drive means contained in handle 16, the drive means being connected to an appropriate power source in a known manner. As disclosed in the aforementioned patent, the blade 14 is retained in an assembled relation on the ring member with the gear teeth 26 annularly slidable in the groove 24 by a retaining means comprising a retaining sector member 28 shown as being a plate-like member secured to the sector portion 20 of handle 16. The retaining member 28 is flexible in character so that its outer ends will have a limited springing movement relative to the ring member 12 to permit the blade 14 to be removed and reinserted into groove 24. As disclosed in said patent, a screw 30 is mounted on the springable portion 29 of the retaining member and by means (not shown) the springable portion can be drawn into holding engagement with a shoulder on the support ring 12 but can be released therefrom to permit removal of the blade 14 from the support ring 12.

The specific details not shown nor described herein can be seen by reference to the aforementioned patent.

Heretofore, the section cut or trimmed from the work body could be of any desired thickness, depending upon the manner in which the cutting device is manipulated and the amount of force applied thereto. Should an inexperienced operator apply irregular forces to the device, an undesirable irregular surface would result on the trimmed work body, too little fatty tissue would be removed, or excessive lean tissue would be removed. As disclosed below, the improvement comprising this invention relates to a depth control means for positively controlling the thickness of the slice or section to be severed from the work body.

The means for controlling the depth of cut, and which comprises the improvement of this invention, is best illustrated in FIGURES 2 and 3 and includes a convex depth control plate 32 disposed within the common opening 18 of the support ring 12 and blade 14. The plate is slightly smaller in diameter than the cutting edge of blade 14 and is adjustable by means of an adjusting bolt 34 extending upwardly therefrom through a mounting bracket, generally designated 36, extending radially outwardly over the common axial opening 18. The mounting bracket has a rear plate 36a which abuts against the gear chamber portion 22 of the handle sector 20 and is secured thereto by means of screws 38. The bracket includes a top plate 36b extending axially away from the handle 16 above and spaced from the common axial opening 18 and has side bracing plates 36c.

When the cutting device is used as above described, the sliced section severed from the work body passes between the blade 14 and the peripheral edge of the convex plate 32 in the direction of arrow B (FIGURE 2). The thickness of the severed section is controlled by the spacing between the blade 14 and the convex plate 32. The plate 32 is adjustable generally in the direction of the axis of the common opening 18 to vary the distance between the blade and plate, thus varying the thickness of the section severed from the work body. In the embodiment illustrated, this adjusting means comprises nuts 40 threaded onto the adjusting bolts 34 on each side of the upper plate 36b of the mounting bracket 36. A stabilizer pin 42 is welded to the upper surface of the adjusting plate 32 and extends upwardly through the upper plate 36b of mounting bracket 36 to prevent the adjusting plate 32 from rotating when the nuts 40 are loosened to adjust plate 32. As the nuts 40 are turned downwardly on the threaded adjusting bolt 34, the convex adjusting plate 32 is raised in relation to the roating blade 14 widening the gap between the blade edge 16 and the periphery of adjusting plate. Thus, a thicker section from the work body is permitted to pass between the blade and plate through the common axial opening 18. Vice versa, as the nuts 40 are turned upwardly in relation to the adjusting bolts 34, the plate 32 is lowered causing its peripheral edge to come closer to the edge of the rotating blade 14 lessening the gap therebetween to permit a thinner section to be cut from the work body.

It is to be understood that the depth control means disclosed herein is not limited to a manually controlled trimmer as disclosed in the aforementioned patent, but is equally adapted for use with automatic or remote control trimmers and the like.

The depth control plate 32 is convex in shape not only to reduce friction as the cutting device is drawn over the work body, but also to provide a guiding surface for the cut section as it passes between the blade 14 and the plate in the direction of arrow B (FIGURE 2) and to smooth the product being trimmed.

Thus, it can be seen that a cutting device of the character described has been provided with a novel depth control means which positively controls the depth of cut in defatting, trimming or similar operations and is such as to be easily used by an inexperienced operator.

The foregoing detailed description is given for clearness of understanding only and no unnecessary limitations are to be understood therefrom, as some modifications will be obvious to those skilled in the art.

I claim:

1. In a meat trimming device or the like adapted to be manually held and manipulated for cutting a strip-like section or slice from a work body by drawing the the tool thereacross, said device including an annular support means lying substantially in a flat plane and supporting an annular cutting blade mounted for rotation in the direction of its own circumference, a handle means rigid with said support means, said support means and blade extending in a continuous relation around, and lying outside of, a common axial opening through which the severed section passes during the cutting thereof from said work body as the blade rotates and the support means is manually drawn across said body substantially in said plane to sever said section therefrom, the improvement comprising a depth control plate mounted on said device and disposed within said common axial opening whereby said severed section passes between said blade and said depth control plate, and means for adjusting said plate generally in the direction of the axis of said common axial opening to vary the distance between said plate and blade to vary the thickness of the section severed from said work body, said depth control plate being adjustably mounted by means of a bracket secured to said annular support means at one point of the circumference thereof and extending radially outwardly over said common axial opening.

2. The meat trimmer of claim 1 wherein said adjusting means includes an adjusting bolt extending from said depth control plate through said mounting bracket for adjusting said plate toward and away from said bracket generally in the direction of the axis of said common axial opening to vary the distance between said plate and blade.

3. The meat trimmer of claim 1 wherein said depth control plate is provided with a stabilizer pin secured thereto and slidably received in an opening in said mounting bracket to prevent rotation of said plate when the same is being adjusted.

References Cited
UNITED STATES PATENTS

| | | | |
|---|---|---|---|
| 977,317 | 11/1910 | Lance et al | 30—276 |
| 1,006,970 | 10/1911 | Moen | 30—276 |
| 1,514,104 | 11/1924 | Ruffing | 30—276 |
| 1,641,505 | 9/1927 | Sayre | 30—286 X |
| 2,471,235 | 5/1949 | Nick | 30—276 |
| 1,589,465 | 6/1926 | Gury | 30—264 |
| 2,598,711 | 6/1952 | Musso | 30—49 |
| 3,024,532 | 3/1962 | Bettcher | 30—276 |
| 3,269,010 | 8/1966 | Bettcher | 30—276 |

MYRON C. KRUSE, Primary Examiner

U.S. Cl. X.R.

30—293